United States Patent
Weiler et al.

(10) Patent No.: US 10,900,841 B2
(45) Date of Patent: Jan. 26, 2021

(54) RADIATION DETECTOR AND METHOD FOR MANUFACTURING A RADIATION DETECTOR

(71) Applicant: Fraunhofer-Gesellschaft zur Foerderung der angewandten Forschung e.V., Munich (DE)

(72) Inventors: Dirk Weiler, Herne (DE); Kai-Marcel Muckensturm, Duisburg (DE); Frank Hochschulz, Ahaus (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 165 days.

(21) Appl. No.: 15/399,514

(22) Filed: Jan. 5, 2017

(65) Prior Publication Data
US 2017/0299438 A1  Oct. 19, 2017

Related U.S. Application Data

(63) Continuation of application No. PCT/EP2015/065719, filed on Jul. 9, 2015.

(30) Foreign Application Priority Data
Jul. 9, 2014 (DE) .................... 10 2014 213 369

(51) Int. Cl.
*G01J 5/20* (2006.01)
*G01J 5/34* (2006.01)
(Continued)

(52) U.S. Cl.
CPC ............. *G01J 5/0235* (2013.01); *G01J 5/023* (2013.01); *G01J 5/024* (2013.01); *G01J 5/0225* (2013.01); *G01J 5/046* (2013.01); *G01J 5/0809* (2013.01); *G01J 5/20* (2013.01); *G01J 5/34* (2013.01); *G01J 5/28* (2013.01)

(58) Field of Classification Search
CPC ........ G01J 5/0235; G01J 5/0225; G01J 5/023; G01J 5/024; G01J 5/046; G01J 5/0809; G01J 5/20; G01J 5/34; G01J 5/28
See application file for complete search history.

(56) References Cited

U.S. PATENT DOCUMENTS 5,912,464 A  6/1999  Vilain et al.
6,144,285 A * 11/2000  Higashi ................... G01J 5/20
                                                     257/467
(Continued)

FOREIGN PATENT DOCUMENTS

DE  102011081641 A1  2/2013

OTHER PUBLICATIONS

Johnson, et al., "A brief review of atomic layer deposition: from fundamentals to applications", Materials Today, vol. 17, No. 5, Jun. 2014, pp. 236-246.
(Continued)

*Primary Examiner* — Christine S. Kim
(74) *Attorney, Agent, or Firm* — Perkins Coie LLP; Michael A. Glenn

(57) ABSTRACT

A radiation detector includes a substrate and a membrane suspended above the substrate by spacers, wherein the spacers electrically contact a radiation sensor formed in the membrane and thermally insulate the membrane from the substrate.

29 Claims, 15 Drawing Sheets

(51) Int. Cl.
  *G01J 5/02* (2006.01)
  *G01J 5/04* (2006.01)
  *G01J 5/08* (2006.01)
  *G01J 5/28* (2006.01)

(56) References Cited

U.S. PATENT DOCUMENTS

| | | | | |
|---|---|---|---|---|
| 7,268,350 | B1* | 9/2007 | Ouvrier-Buffet | G01J 5/02 |
| | | | | 250/336.1 |
| 7,842,533 | B2* | 11/2010 | Liger | G01J 5/02 |
| | | | | 257/232 |
| 8,097,850 | B2* | 1/2012 | Uchida | G01J 5/10 |
| | | | | 250/338.1 |
| 9,401,377 | B2* | 7/2016 | Boutami | G01J 5/02 |
| 2004/0140428 | A1* | 7/2004 | Ionescu | G01J 5/20 |
| | | | | 250/338.1 |
| 2005/0082480 | A1* | 4/2005 | Wagner | G01J 5/60 |
| | | | | 250/338.1 |
| 2008/0237467 | A1 | 10/2008 | Hosako et al. | |
| 2010/0314544 | A1 | 12/2010 | Ouvrier-Buffet et al. | |
| 2011/0049366 | A1* | 3/2011 | Yang | G01J 5/04 |
| | | | | 250/338.4 |
| 2012/0228733 | A1* | 9/2012 | Garcia-Blanco | B81B 7/0038 |
| | | | | 257/467 |
| 2013/0056733 | A1 | 3/2013 | Kropelnicki et al. | |
| 2013/0234270 | A1* | 9/2013 | Yama | H01L 27/14649 |
| | | | | 257/431 |
| 2014/0175588 | A1 | 6/2014 | Purkl et al. | |
| 2015/0115160 | A1* | 4/2015 | O'Brien | B81B 7/0019 |
| | | | | 250/349 |
| 2015/0362374 | A1* | 12/2015 | Wheeler | G01J 5/20 |
| | | | | 250/332 |
| 2016/0178444 | A1* | 6/2016 | Oulachgar | G01J 5/20 |
| | | | | 250/349 |
| 2016/0223404 | A1* | 8/2016 | Samarao | G01J 5/024 |
| 2017/0314995 | A1* | 11/2017 | Rocznik | G01J 5/06 |

OTHER PUBLICATIONS

Niklaus, Frank et al., "Memes-Based Uncooled Infrared Bolometer Arrays—A Review", XP-002586083; SPIE Proceedings, the International Society for Optical Engineering—SPIE, Bellingham, Washington, USA,' Bd. 6836, Nov. 12, 2007, Seiten 68360D-1; ISSN:0277-786X, DOI: 10.117.12.755128, Nov. 2007, 68360D-1.

* cited by examiner

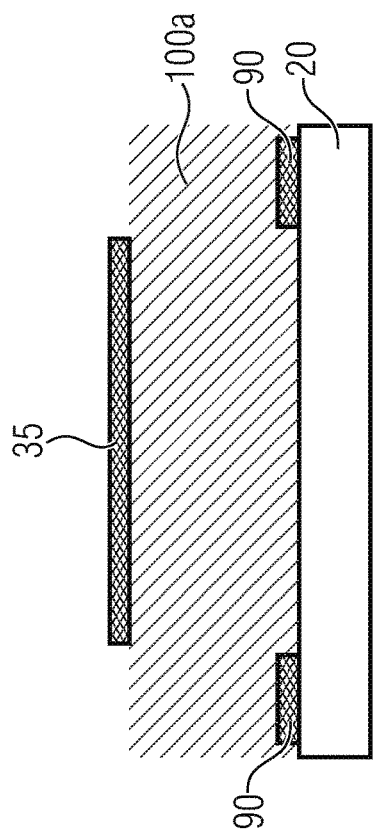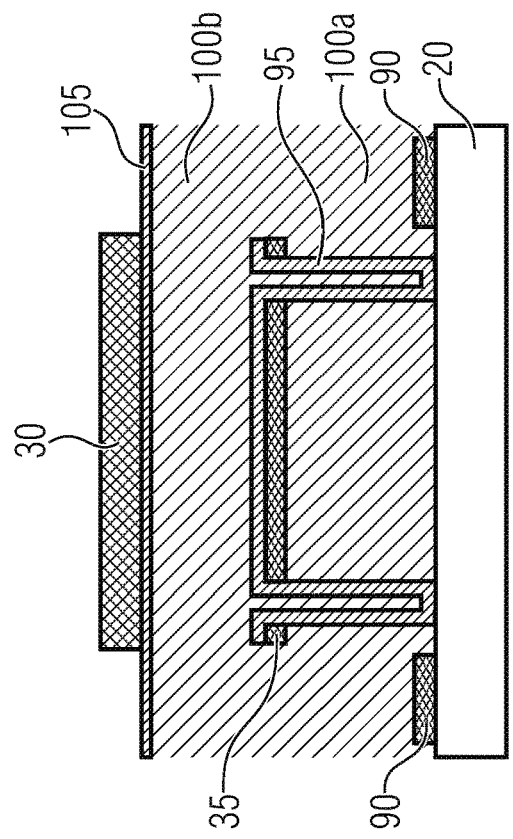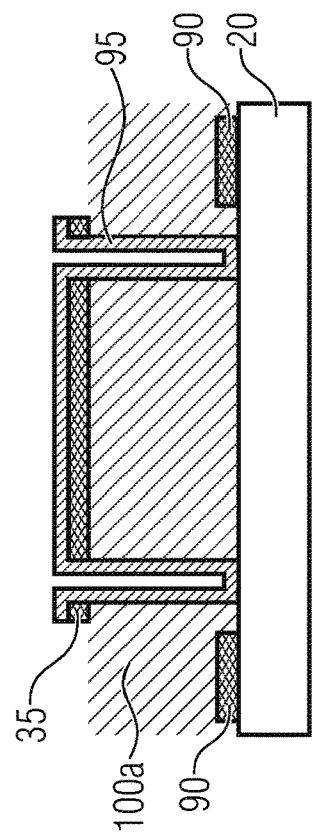

RADIATION DETECTOR AND METHOD FOR MANUFACTURING A RADIATION DETECTOR

CROSS-REFERENCE TO RELATED APPLICATIONS

This application is a continuation of copending International Application No. PCT/EP2015/065719, filed Jul. 9, 2015, which is incorporated herein by reference in its entirety, and additionally claims priority from German Application No. DE 10 2014 213 369.6, filed Jul. 9, 2014, incorporated herein by reference in its entirety.

The present invention relates to a radiation detector, an array of a plurality of radiation detectors and a manufacturing method for manufacturing a radiation detector, wherein the radiation detector may be, for example, a bolometer.

BACKGROUND OF THE INVENTION

Uncooled resistance microbolometer (hereinafter denoted as microbolometer) arrays may be used for detecting far infrared radiation (8 μm-14 μm) and are also included within the term infrared focal plane arrays (IRFPA). Individual microbolometers, as shown in FIG. 11, may be characterized by a membrane 10 suspended in a vacuum over the substrate 20 by two metal contacts 15 by using thin ridges and which is thermally insulated by the ridges 22 (shown in FIG. 12). Essentially the membrane consists of an absorber layer 25 and a sensor layer 30. To ensure a lowest possible reflection of the incident infrared radiation, the layer resistance of the absorber layer 25 may be adapted to the wave resistance of vacuum (about 377 Ohm/sq). Furthermore, below the membrane there may be a metal layer (reflector) 35 on the substrate 20, whereby the partly transmitted radiation is reflected back and subsequently absorbed again by the upper absorber layer. The cavity 40 between the absorber layer 25 and the lower reflector forms an optical resonator. To meet the resonator condition (Eq. 1), the distance may be selected so that the optical path (nd) is an odd multiple of a quarter of the main wavelength λ to be detected. The optical path is comprised of the sum of the layer thicknesses weighted with the refractive indexes of the media inside of the cavity (Eq. 2). For a body having a temperature of, e.g., 300 K, the maximum spectral radiance would be at about λ=10 μm. This results in an optical path of nd=2.5 μm (k=0).

$$nd = (2k+1)\frac{\lambda}{4} \quad (k = 0, 1, 2 \ldots) \quad \text{(Eq. 1)}$$

$$nd = \sum n_i d_i \quad \text{(Eq. 2)}$$

Due to the absorption of the incident infrared radiation, the thermally insulated membrane 10 may heat up, which, for example, may result in a change of the electrical resistance of the sensor layer 30. In this context, the temperature change of the membrane 10 depends on the thermal insulation by means of the ridges 22 and on the energy of the absorbed radiation, and is generally by several magnitudes smaller than the change of the radiator temperature. The resistance change of the sensor layer may then be determined by using a readout circuit (ROIC).

A decisive performance indicator for microbolometers is the so-called noise equivalent temperature difference (NETD). This factor is defined as the temperature change of an object generating a change of the measure signal corresponding to the noise of the system and is therefore a measure of the sensitivity of the sensor (Eq. 3).

$$NETD = \frac{4F^2}{A\varepsilon\pi\frac{dL}{dT}} \frac{\sqrt{\overline{u_n^2}}\, g_{th}}{U_{bias}TCR} \quad \text{(Eq. 3)}$$

F is the f-number, A is the absorber area, c is the emission coefficient, L is the radiance and T is the temperature of the object, $\overline{u_n^2}$ is the square of the overall noise voltage, $g_{th}$ is the thermal conductance and $U_{bias}$ is the bias voltage.

From Eq. 3 it is apparent that the NETD, amongst others, is significantly affected by the thermal insulation of the membrane, more specifically by the corresponding thermal conductance $g_{th}$. Generally, the membrane is poorly thermally insulated from the substrate by using only the suspension on the metal contacts. In this case, the resulting thermal conductance is not sufficiently small enough to achieve a good performance, since, due to process and stability reasons, the contact tubes consist of thick metal coatings and therefore conduct relatively well the arising heat in the membrane. The limit for the NETD should be, for example, significantly less than 100 mK, however, it may be larger (smaller NETD values correspond to a better performance).

In conventional microbolometers, a significant improvement of the thermal insulation, more specifically a reduction of the thermal conductance, is realized through additional connection elements, the ridges 22, between the suspended membrane and the metal contacts. The thermal conductance of the ridges may be determined as $$g_{ridges} = 2\frac{b_{ridge}d_{ridge}}{l_{ridge}}\sum \lambda_i \quad \text{(Eq. 4)}$$

wherein $\lambda_i$ is the thermal conductivity of the individual ridge materials, $b_{ridge}$ is the width and $d_{ridge}$ is the thickness of the individual ridge materials and $l_{ridge}$ is the length of the ridges. Hence, to achieve a good thermal insulation, the cross-sectional area of the ridges should be as small as possible and the ridges should consist of materials possessing low thermal conductivity. With respect to heat insulation, the percentage of the metal contacts is mostly to be neglected compared to that of the ridges. In most cases, thermal insulation may be affected by the heat radiation to the surroundings. However, since the infrared detectors are operated in a vacuum, the influence is also mostly very small so that the thermal conductivity of the ridges dominates overall.

The trend in the development of microbolometers moves towards increasingly smaller pixel sizes for high-resolution IRFPAs with simultaneously increasing requirements in terms of performance. Currently, microbolometer arrays are typically manufactured with a pixel pitch of 17 μm. However, it is foreseeable that over the next few years a new generation with a pixel pitch of 12 μm will prevail. Scaling the pixel pitch from 17 μm to 12 μm means halving the absorber area 25. Generally, a decrease of the pixel pitch due to the reduction of the absorber area 25 may have a massive impact on the performance of the microbolometers.

The effective absorber area 25 may be limited due to the area necessitated for realizing the ridges. Depending on the design and the structure of the ridges, in other words the target value of the thermal conductance, the areas occupied by the ridges 22 may have different sizes. However, just like the thermal conductance, the absorber area 25 may also have an impact on the performance. Now, if the pixel area is decreased by a certain factor, theoretically, the entire microbolometer could be scaled accordingly so that the proportions of the respective areas (ridges 22, contacts 15, absorber area 25) and distances with respect to one another may remain the same. The performance loss would then be determined, amongst others, by the scaling factor. However, the problem regarding scaling is that, in this case, the limits of lithography could be quickly reached. Typically, stepper lithography with a resolution of 0.35 μm is used for manufacturing microbolometer arrays. Frequently, structure sizes at the limit of this resolution are already used in current but also in older microbolometer generations (17 μm, 25 μm, 35 μm) such as, for example, regarding the ridge widths and distances. On the other hand, the contact holes and upper contact areas may not be scaled to be arbitrarily small also due to process and stability reasons, so that here a limit also exists. Due to these problems, particularly the ridge areas necessitate more and more space relative to the pixel size at a set thermal conductance (specified by concept), whereby the effective absorber area is additionally decreased and the performance is heavily impaired.

In the literature, another arrangement has been presented wherein the absorber layer is stretched over the entire pixel area in an umbrella-like manner. Such an arrangement is referred to as a two-layer design or, specifically, an umbrella design. Hereby, it is also possible to manufacture bolometers with large absorber areas and having, at the same time, good thermal insulation. However, the disadvantage in this case is that the ridges and the sensor layer are still located in one plane. Thermal insulation is thereby limited by the free available pixel area. Furthermore, the resonator condition is not met in the region of the suspension of the absorber, having a negative effect on the absorption. The manufacturing process of two-layer bolometers (ridges and absorber not in one plane) also involves clearly increased expenditure.

SUMMARY

An embodiment may have a radiation detector including a substrate and a membrane suspended above the substrate by spacers, wherein the spacers electrically contact a radiation sensor formed in the membrane and predominately thermally insulate the membrane from the substrate.

Another embodiment may have an array of inventive radiation detectors.

Another embodiment may have a method for manufacturing a radiation detector including a substrate and a membrane suspended above the substrate by spacers, wherein the spacers are manufactured by using ALD and a sacrificial layer method so that the spacers electrically contact a radiation sensor formed in the membrane and predominantly thermally insulate the membrane from the substrate.

The present invention is based on the idea that, in the case of a membrane of a radiation detector, the membrane is suspended over a substrate by spacers such that the spacers electrically contact a radiation sensor formed in the membrane, the spacers may additionally function as a thermal insulation, whereby losses in the membrane-area yield due to ridges for thermal insulation may be reduced or even eliminated. The thermal insulation may be facilitated by a very thin and even layer of a contact material in the spacer, the layer being created, for example, by using ALD (Atomic Layer Deposition). For example, the ALD layer is created on side edges of a sacrificial layer structured by using an etching process such as a DRIE process, a Bosch process or a cryogenic process. Also, the formation of long and thin spacers has positive effects on thermal insulation.

According to an embodiment, a reflector may be disposed between the substrate and the membrane. It may rest on the substrate or be suspended over the substrate by using additional spacers. As a result, regardless of a length of the spacers on which the membrane is suspended, the distance between the reflector and the membrane may be adapted such that it will be an odd multiple of a quarter of a main wavelength to be detected. In other words, it is possible, while maintaining a desired membrane/reflector distance, to nevertheless select the length of the spacers to be large so as to ensure sufficient thermal insulation.

According to another embodiment ridges may also be disposed at the membrane in addition to the thermal insulation by using the spacers. The ridges may further increase the thermal insulation provided that the thermal conductance to be achieved cannot be achieved exclusively by using the spacers. However, compared to spacers not functioning as thermal insulators, the area consumption of such ridges is reduced and therefore the membrane-area yield is increased.

BRIEF DESCRIPTION OF THE DRAWINGS

Embodiments of the present invention will be detailed subsequently referring to the appended drawings, in which:

FIG. 8a-h show schematic illustrations of method steps of the manufacturing method;

DETAILED DESCRIPTION OF THE INVENTION

Figure 1:
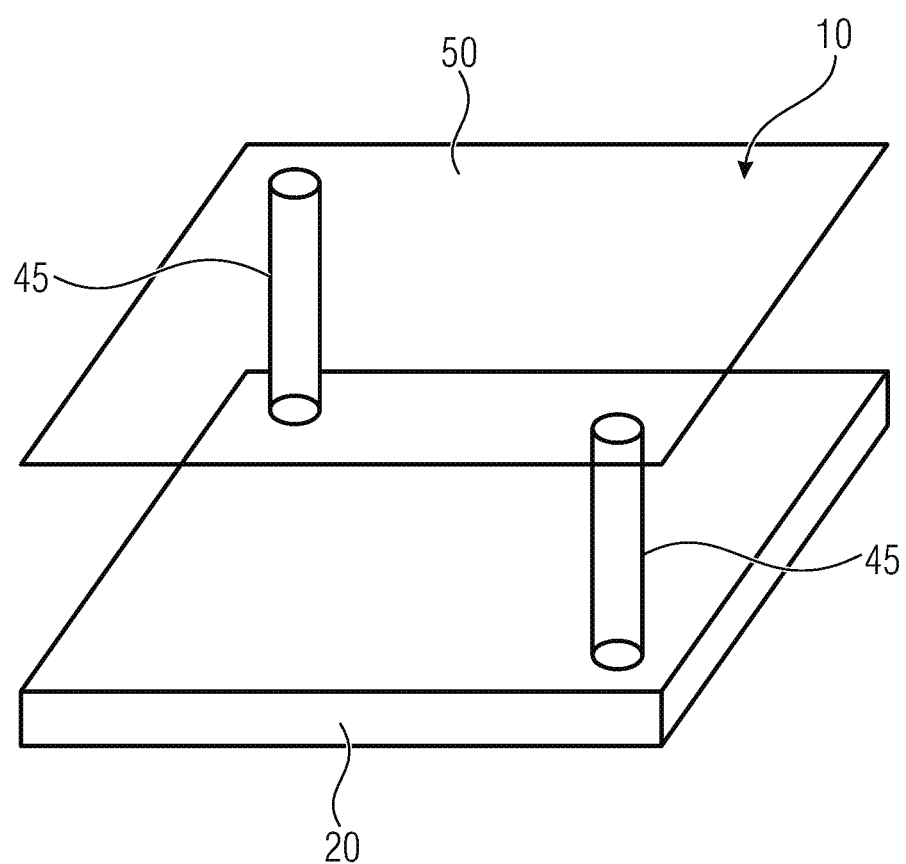
FIG. 1 shows a schematic illustration of a radiation detector, wherein a membrane is suspended on a substrate by spacers.

FIG. 1 shows a radiation detector with a substrate 20 and a membrane 10 suspended above the substrate 20 by spacers 45. A radiation sensor 50 is formed in the membrane 10 which may be electrically contacted to the substrate 20 and thermally insulated from the substrate 20 by the spacers 45. In the following, the spacers 45, the membrane 10 and the substrate 20 will be described in detail.

The spacers 45 may realize the thermal insulation of the membrane 10 from the substrate 20, while the electromagnetic radiation detectors are simultaneously electrically contacted, wherein the latter may be embodied, for example, as sufficiently long and thinly layered hollow tubes which, for example, may be manufactured by using technologies and methods of microsystem technology. As described above, due to the thick metal coating, the respective thermal conductance of the contacts, more specifically of the spacers, is thus far very large as compared to the ridges and does therefore not contribute to thermal insulation. The proportion in the thermal insulation amounts to less than 2%. However, if the walls of the, e. g., round contacts are coated sufficiently thinly with a suitable metal layer, a corresponding thermal conductance may result therefrom, which may be comparable to that of the ridges 22 or may even be significantly smaller. The thermal conductance of the spacers 45 may be calculated analogously to Eq. 4, wherein in this example, as shown in FIG. 2, circular rings form the respective cross-sectional areas.

$$g = \frac{\pi}{2l} \sum \lambda_i (r_{i,2}^2 - r_{i,1}^2) \quad \text{(Eq. 4)}$$

Figure 2A:
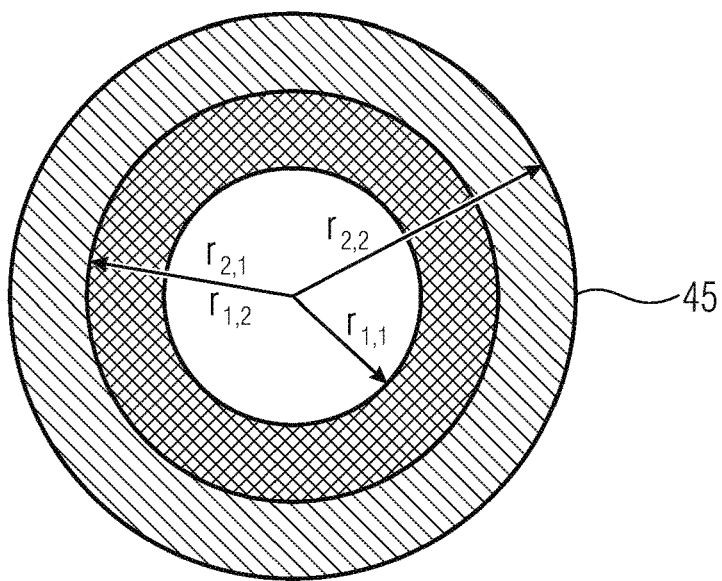
FIG. 2a shows a schematic illustration of a spacer consisting of two layers of different materials and is hollow on the inside.

In FIG. 2a, the radiuses $r_{1,1}$, $r_{1,2}$ and $r_{2,1}$, $r_{2,2}$, respectively, are exemplarily illustrated, however the spacers may also consist of one or a plurality of layers. The term $r_{1,2}-r_{1,1}=d_i$ is equivalent to the thickness of the individual materials/layers inside of the contacts, l denotes a length of the spacers and $\lambda_i$ denotes the thermal conductance of the layer i. i is therefore the index of a layer as well as the running index of the sum and has the value range $1 \leq i \leq N$, wherein N is the number of the layers. N may be any natural number. i, for example, increases from the inside to the outside, that is, i corresponds to the rank of the layer from the inside to the outside. The second index of the radiuses describes the inner radius (1) and the outer radius (2) of a layer. Further, $r_{1,2}=r_{i+1,1}$ applies when the layers rest on one other without a gap. If the spacer 45 is configured of only one layer (N=1), the sum may be formed of one element only and is therefore to be omitted. Analogously, instead of the circular design, the spacers may comprise any other shape. Likewise, the spacers 45 may be filled, for example, with a thermally insulating material instead of being hollow on the inside. In this case, for example $r_{1,1}=0$ would apply.

Figure 2B:
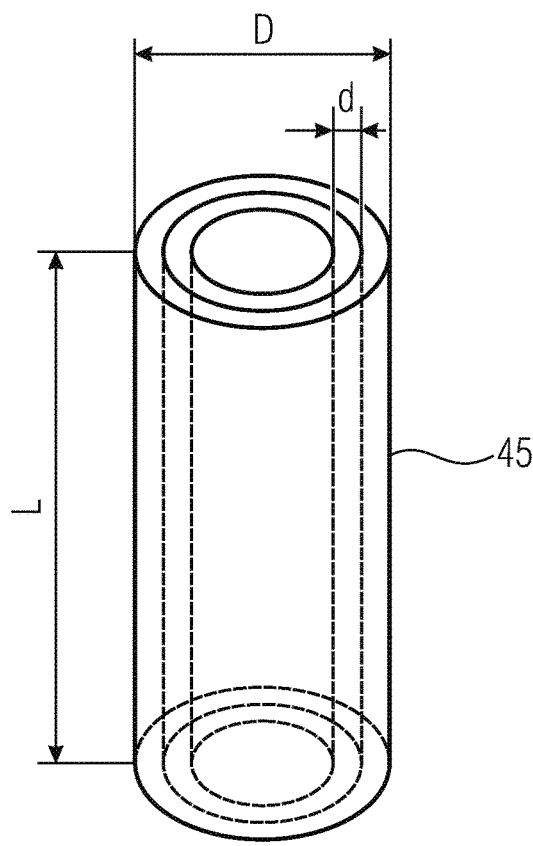
FIG. 2b shows a schematic illustration of a spacer consisting of two layers of differing materials and is hollow on the inside.

Similar to the ridges, the spacers 45 should also be as long as possible and consist of very thin materials/layers comprising a low thermal conductivity. This emerges, for example, from Eq. 4. In other words, it is desirable that, when the overall diameter D of the contacts, that is, $r_{N,2}$ (in FIG. 2 denoted as $r_{2,2}$), is selected to be as small as possible, for example such that a cross-sectional area of the spacer 45 is smaller than or equal to 7 µm², in another embodiment smaller than or equal to 3 µm² and in an embodiment smaller than and equal to or smaller than 0.8 µm². Otherwise, many thin layers or few thick layers may form a large diameter, in both cases resulting in a larger conductance. Hence, for a lower conductance, the aspect ratio of the length l to the diameter D also needs to be taken into account. For example, it is equal to or larger than 10, however, in another embodiment it may also be equal to or larger than 5 or in an alternative embodiment it may be equal to or larger than 1. These principles also apply to any other spacers apart from the round spacers described herein; however, Eq. 4 needs to be adapted accordingly for this. The cross-section of the spacers could, for example, also be square or rectangular or any other shape. Generally, for a layer i, the pair $r_{i,2}$ and $r_{i,1}$ could be selected so that $r_{i,2}^2$ corresponds to the area bound by the outside of the cross-section of the layer i and $r_{i,2}^2-r_{i,1}^2$ corresponds to the area of the cross-section of the layer i. $r_{N,2}$ would then correspond to a "width". FIG. 2b shows another dimensioning of the spacers.

Beside the thermal insulation, the second function of the spacers may consist of electrically contacting this element. Generally, the spacers consist of one electrically conducting layer. To protect the electrically conducting layer during the etching process of the sacrificial layer, other protection layers may optionally also be deposited with the atomic layer coating. The protection layers should be electrically and thermally insulating and stable with respect to the etching medium of the sacrificial layer. The thicknesses of all layers of the spacers are within a range of 0.1 nm-1 µm, but may also be thinner or thicker.

As described above, the membrane 10 supported by the spacers 45 consists of an element changing its electrical characteristics when fed with heat, and an absorber layer. The temperature sensitive element consists of a temperature-dependent electrical resistor, a temperature-dependent capacitance, a temperature-dependent inductivity or a diode (pn junction). The absorber layer may be selected such that its reflection coefficient is similar to that of air so that a smallest possible part of the incident radiation is reflected.

The substrate may, for example, be made of a semiconductor or a different material. Beside the base area for the spacers, a temperature evaluation circuit may be integrated in the substrate. For example, the same is disposed directly below the membrane; however, it may be disposed at a different location.

Figure 3:
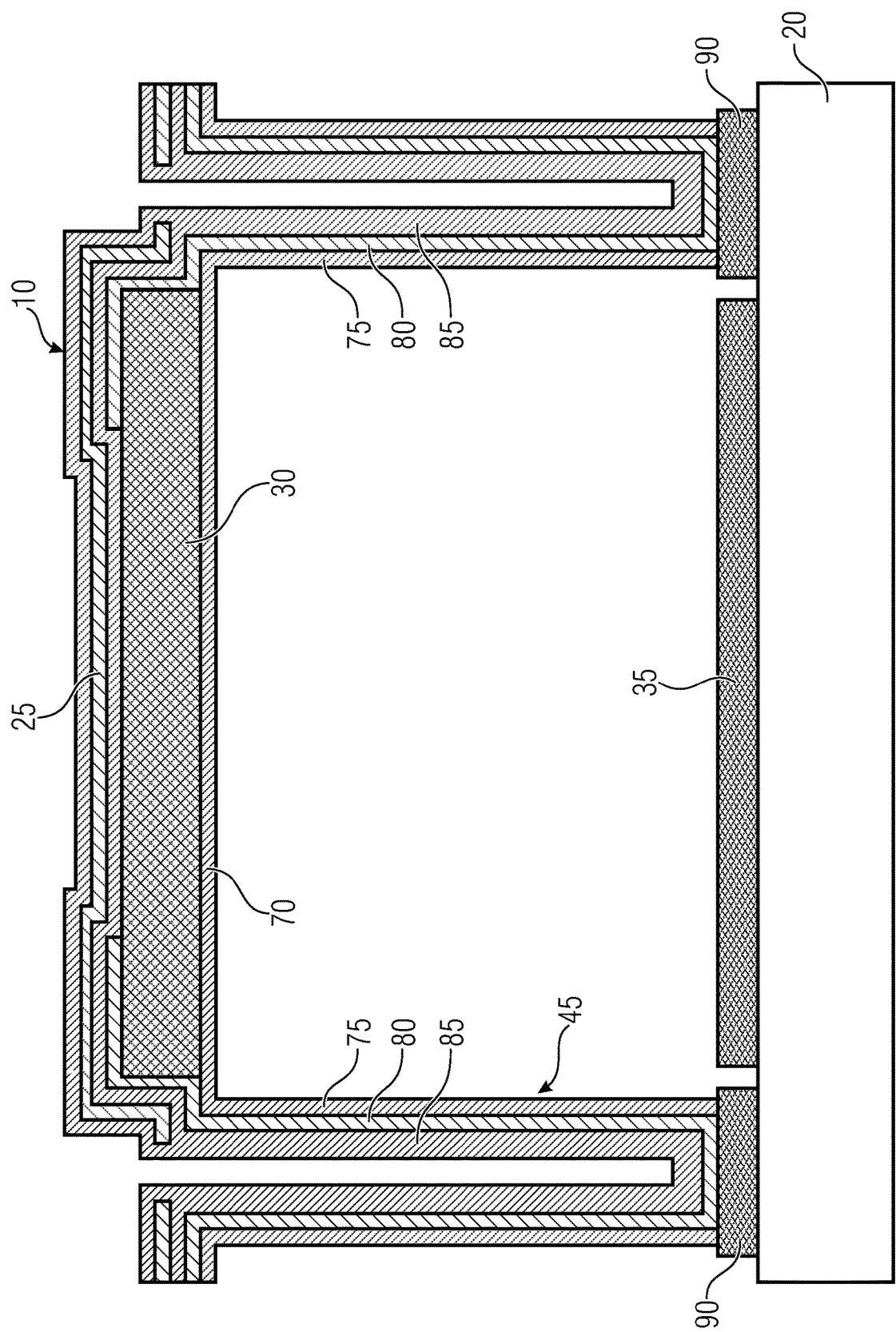
FIG. 3 shows a cross-section of a radiation detector, wherein a reflector is disposed on the substrate, and the contacting and the layers of the membrane are shown.

FIG. 3 shows an application example of the realization of the thermal insulation and contacting of electromagnetic radiation detectors by using the suspension. Exemplary, it is the cross-section of a resistance microbolometer. In this embodiment, a reflector 35 reflecting back the radiation that is transmitted by the membrane 10 onto the radiation sensor 45 is disposed on the substrate 20.

The membrane may consist of a sensor layer 30 and an absorber layer 25, for example, which may consist of about 300 nm a-SI and about 7 nm TiN. However, other materials and layer thicknesses are possible. Below the sensor layer 30 and above the absorber layer 25, respectively, an aluminum oxide ($Al_2O_3$) layer 70 with a thickness of 10 nm may be located which serves as protection during etching of the sacrificial layer. Again, other materials and/or differing layer thicknesses are possible as an alternative.

In this case, the spacers consist of three layers 75, 80, 85 deposited, for example, by using the atomic layer deposition ALD, as described above. The method for manufacturing a radiation detector will be described in detail below. The inner and outer layers 75 and 85 may also be, for example, aluminum oxide or another material. The inner layer 75 comprises a typical total thickness of, for example, 20 nm and the outer layer 85 comprises a typical thickness of, for example, 10 nm. These oxide layers are also to protect the middle metal layer during etching of the sacrificial layer. Moreover, the inner $Al_2O_3$ layer may serve as an insulator between the metal electrodes 90 on the sensor layer and the absorber layer 25. The middle metal layer 80, which may serve as contact between readout circuit and sensor layer, consists of, for example, TiN or another electrically conductive but thermally insulating material and comprises, for example, a typical thickness of 5 nm. Each of the layers comprises, for example, a thickness of 1 µm or less. The layer may also be thicker than 1 µm. The diameter of the spacers may be, for example, 400 nm. Generally, for example even in cases of non-round spacers, the cross-sectional area in a first embodiment is smaller than 7 µm$^2$, in a second embodiment smaller than 3 µm$^2$ or in a third embodiment smaller than 0.8 µm$^2$. However, it may also be larger. The length depends on the resonator condition, for example, about 6 µm is typical. As described above, the resonator condition should be met for a maximum absorption of the incident infrared radiation. For this reason, the length of the spacers 45 may not be selected arbitrarily, but should be adapted according to Eq. 1 and/or Eq. 2. Generally, the length of the spacers 45 between substrate 20 and membrane 10 is at least 3 µm and at the most 100 µm. However, it may also exceed this range.

Figure 4:
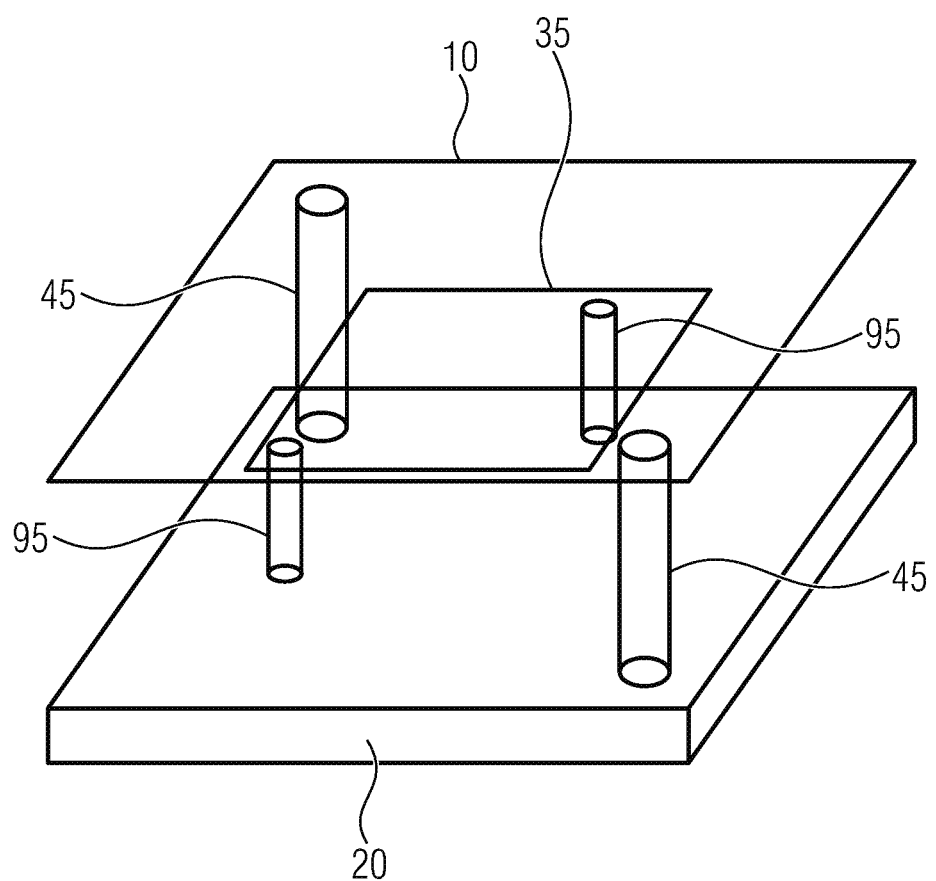
FIG. 4 shows a schematic illustration of a radiation detector, wherein the reflector is suspended above the substrate on further spacers.

FIG. 4 shows an embodiment wherein the restriction due to the resonator condition is omitted by realizing the reflector in terms of process in such a manner that the optical path between itself and the absorber layer 25 is exactly a quarter or an integral multiple of a quarter of a main wavelength to be detected, regardless of the length of the spacers 45. This may be made possible by suspending and therefore elevating the reflector by means of additional spacers 95. The spacers 95 may then be selected such that the resonator condition may be met.

Figure 5:
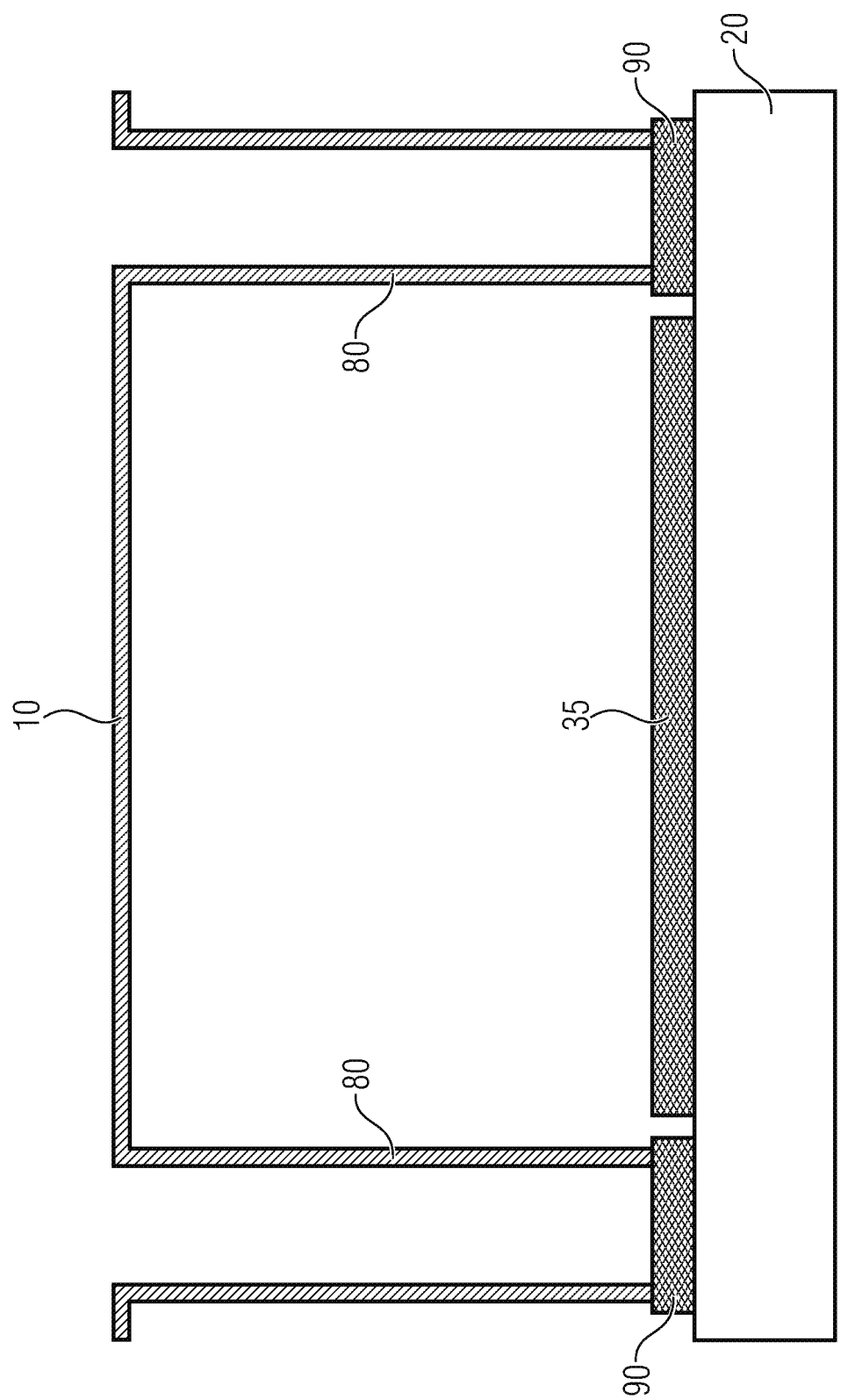
FIG. 5 shows a cross-section of a radiation detector, wherein the spacers as well as the membrane consist of one layer of a material.

FIG. 5 shows a further embodiment wherein the spacers 45 as well as the sensor layer 30 and the absorber layer 25 consist of only one layer 80 of a material. For example, the spacers may be embodied very thinly and may therefore thermally insulate whereas a thicker layer of the same material may represent a thermal sensor. The cross-sectional area may match the cross-sectional areas of multi-layer spacers mentioned above; however, in the case of a single-layer spacer, the cavity inside the spacers comprises a larger cross-sectional area. Alternatively, the cross-section of the single-layer spacer may also be selected to be smaller. However, they may also comprise a larger cross-section. Optionally, this material may be protected by further layers. By this design, the manufacturing process is simplified significantly.

Figure 6:
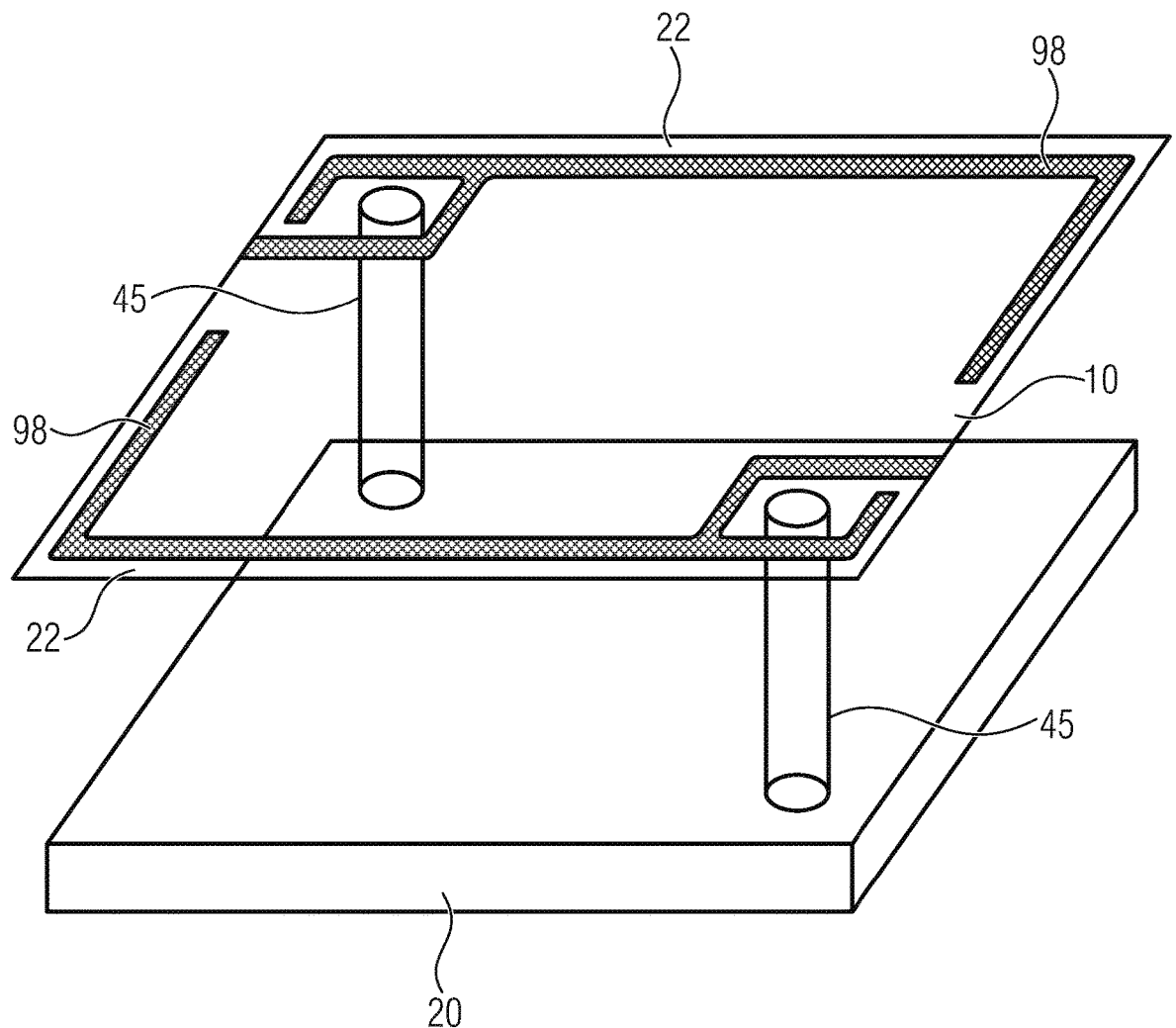
FIG. 6 shows a schematic illustration of a radiation detector, wherein the membrane is suspended on the spacers by ridges.
Figure 7A:
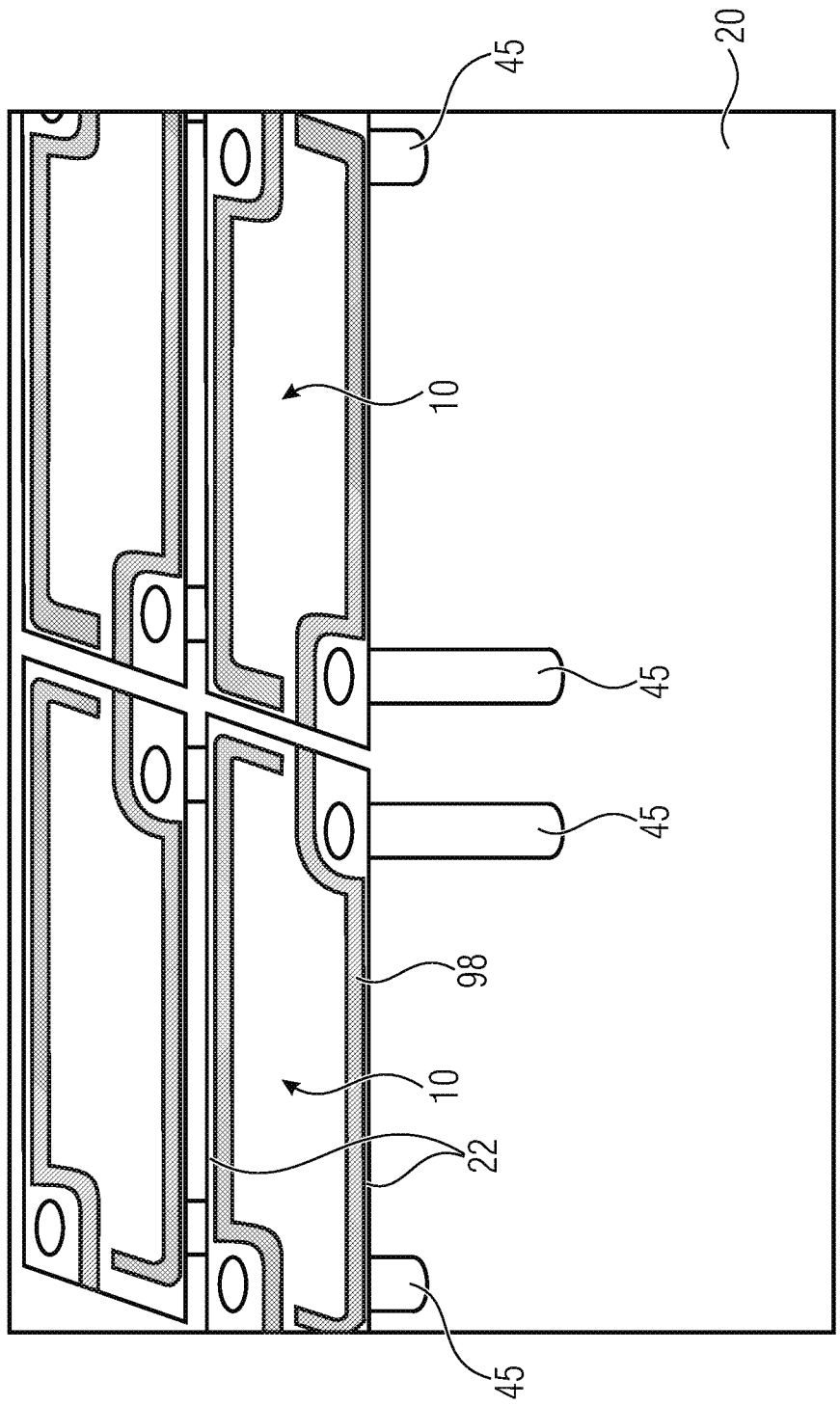
FIG. 7a shows a schematic illustration of an array of radiation detectors.
Figure 7B:
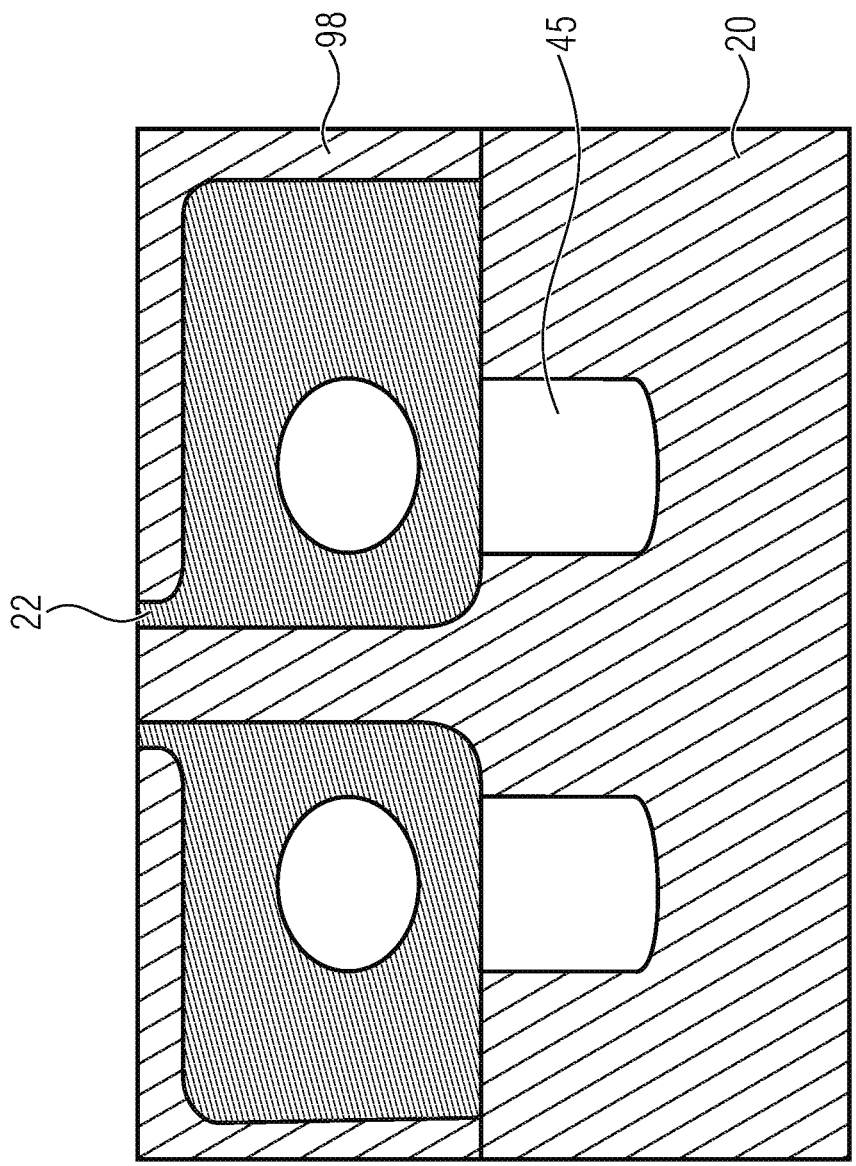
FIG. 7b shows a schematic illustration of a top view of the spacers.
Figure 7C:
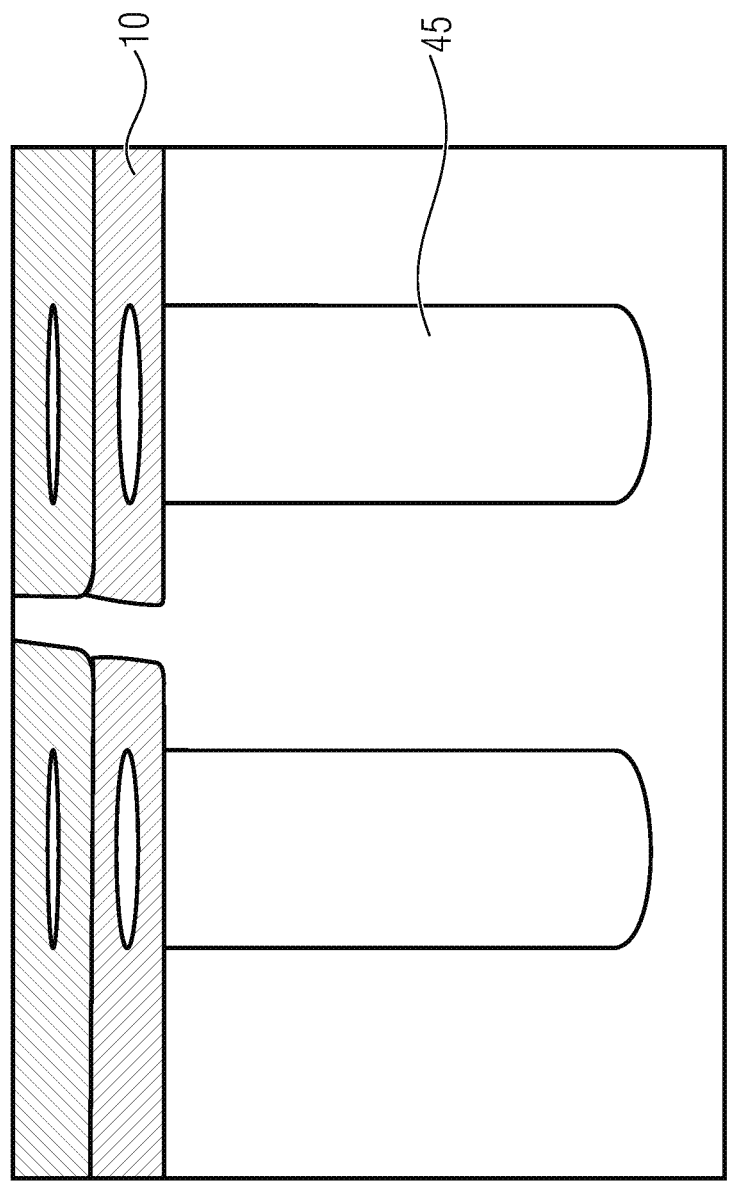
FIG. 7c shows a schematic illustration of a side view of the spacers.

FIG. 6 shows a further case of application. In addition to the thermal insulation of the membrane from the substrate by the spacers described above, the membrane may be suspended on the spacers by ridges 22. In this case, the advantage consists of a further improvement of the thermal insulation, however, at the expense of the effective absorber area. However, numerous combination possibilities arise between spacer design and ridge design, whereby the sensor may be manufactured flexibly. This arrangement is shown in FIGS. 7a-c on the basis of a schematic illustration of a QVGA microbolometer testing structure array. The pixel pitch could be, for example, 17 µm. In this case, the thermal insulation is realized by the spacers and conventional ridges described herein. The ridges 22 may be in a plane with the membrane 10 and be formed of one or multiple layers forming the membrane 10. The ridges 22 may be separated from the membrane 10 by slots 98, except for suspension interfaces between ridges and membrane. The ridges 22 contact the spacers 45 at one end and the membrane 10 at another end. Due to the insulation of the spacers 45, the ridges 22 may be configured shorter and/or narrower compared to the same serving in regards to the electrical contacting only. Further, it is possible to contact only a first spacer 45 by a ridge 22 and to contact a second spacer directly with the membrane 10. In the cases specified, the thermal insulation is predominantly accomplished by the spacers 45, that is, the thermal conductance of the ridges 22 is, for example, larger than the thermal conductance of the spacer 45 connected to the membrane by the ridge 22. However, it may also occur that the spacers 45 comprise a larger thermal conductance.

FIG. 7a shows an array of radiation sensors on a substrate 20. The array of radiation sensors may, for example, form an image sensor for thermal radiation. The membrane is, for example, suspended on the spacers 45 by ridges 22. The spacers electrically contact the substrate and thermally insulate both from each other. FIG. 7b shows a close-up view of the spacers 45 as a plane view and FIG. 7c as a side view.

As already shown in FIG. 7a, forming an array of radiation detectors is also possible, for example, to detect the intensity of multiple radiation sources or to create a two-dimensional image. For this, several membranes may be contacted and thermally insulated with one or several substrates by a plurality of spacers. The temperature evaluation circuits, which, for example, may be disposed in the substrate and may be located, for example, below or next to the membrane, may be, for example, electrically connected to each other, for example, to allow a serial readout, or electrically insulated from each other, for example, to simultaneously read out the information of the temperature evaluation circuits.

FIGS. 8a-h show an exemplary sequence of the method for manufacturing radiation detectors with a reflector suspended on spacers 95 by using the spacers 45 described above for the suspension of the membrane. A possible process flow is shown, outlining the realization of the microbolometer described above including the elevated reflector. For example, the reflector may consist of 200 nm TiN. The inner material of the spacers suspending the reflector may consist of, for example, 50 nm $Al_2O_3$. However, other materials may be used and other layer thicknesses may be used.

Figure 8E:
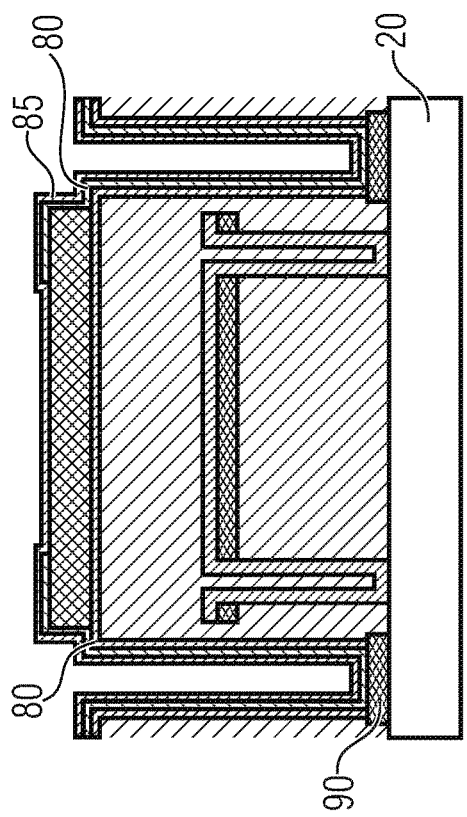
Figure 8F:
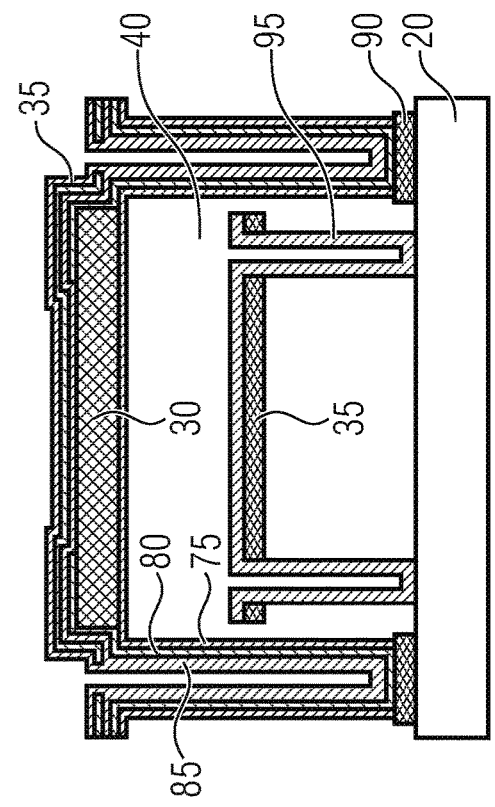
Figure 8G:
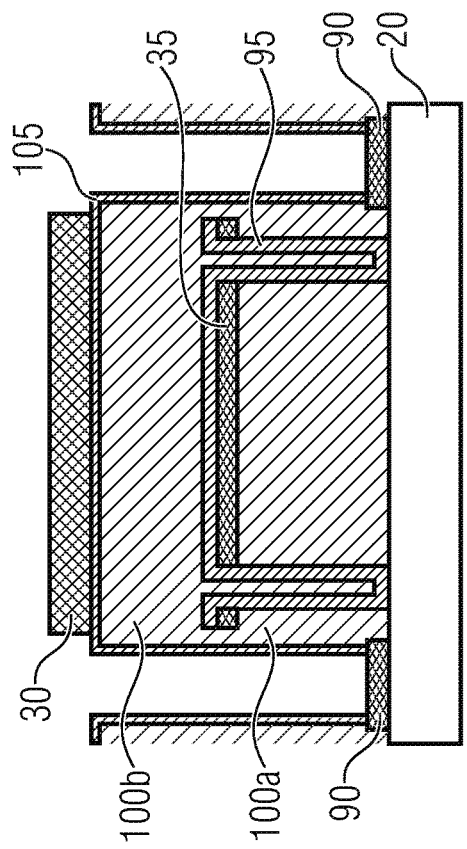
Figure 8H:
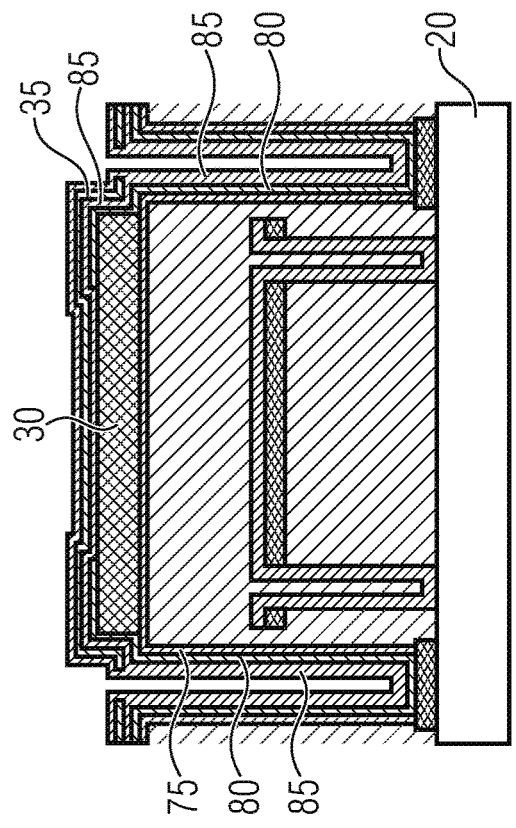

FIG. 8a shows the substrate 20 as well as its contacts 90 embodied on the surface. In the following step (FIG. 8b), a sacrificial layer 100a, for example consisting of a-SI, as well as the reflector material 35, for example TiN, are applied, and in the case of the reflector material, for example a metal, already structured, that is, for example, brought to the predetermined size. Subsequently (FIG. 8c), the sacrificial layer and the reflector are being structured. This may consist of, for example, etching of holes, for example, coated with $Al_2O_3$, and therefore, after removing the sacrificial layer, form the spacers 95 on which the reflector is suspended. In the following (FIG. 8d), a further sacrificial layer 100b may be applied onto the existing sacrificial layer 100a as well as onto the reflector. For example, the sensor layer 30 of the membrane, for example an a-SI layer, may be applied onto this sacrificial layer 100b, protected by a protection layer 105, for example, consisting of $Al_2O_3$. FIG. 8e describes the step of structuring the sacrificial layers 100a and 100b and of the protection layer 105 of the sensor layer 30 of the membrane 10. This consists of, for example, the etching of the sacrificial layer as well of the protection layer 105, for example, by using the Bosch process, as well as the deposition of a further protection layer 75 onto the inner edges of the sacrificial layer. Subsequently (FIG. 8f), the contact layer 80, for example a layer of TiN, is deposited onto the protection layer 75 in the openings as well as the contacts of the membrane and the substrate, followed by a further protection layer 85. After applying the absorber layer 35 of the membrane 10, this protection layer 85 may be broadened and extended over the absorber layer 35 (FIG. 8g). Finally, the sacrificial layers 100a and 100b may be removed (FIG. 8h).

Figure 9:
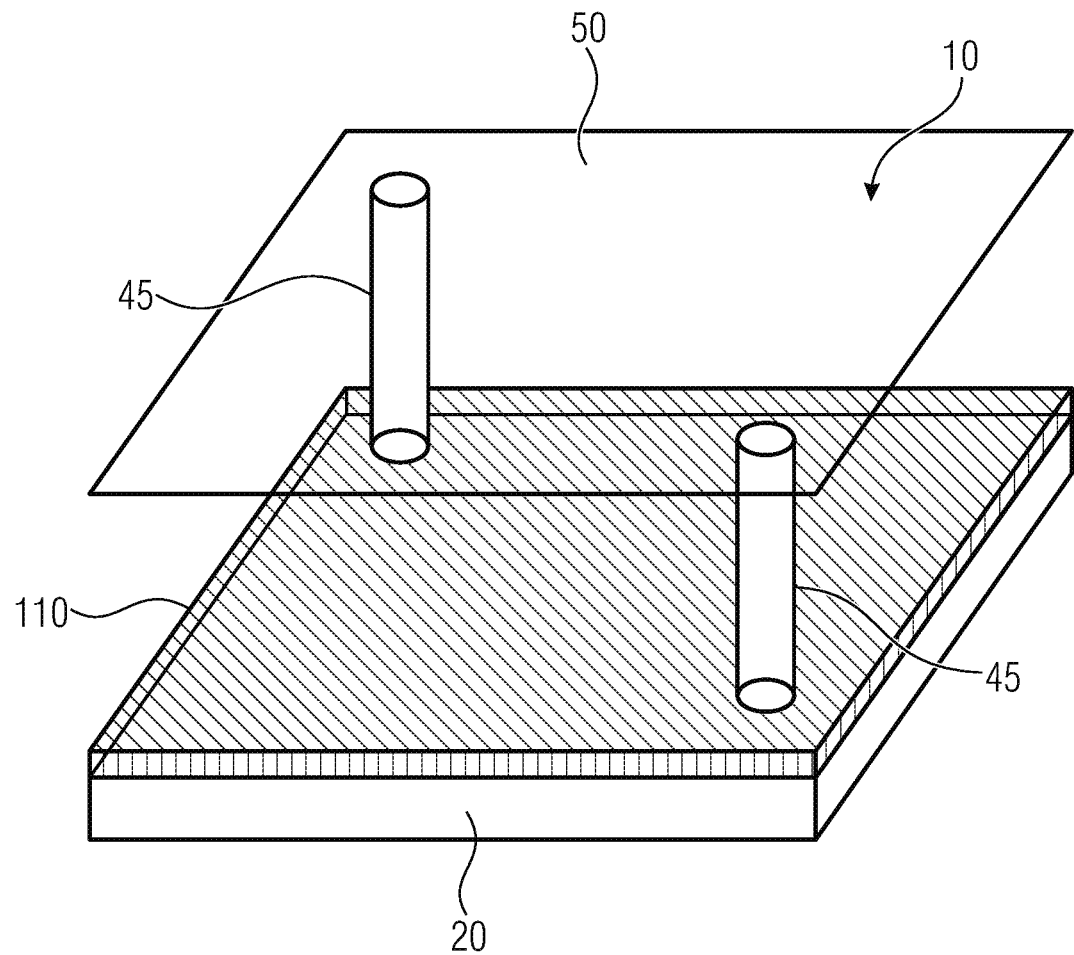
FIG. 9 shows a schematic illustration of a radiation detector, wherein a membrane is suspended on a substrate by spacers and the spacers are stabilized by an oxide layer.

FIG. 9 shows a further embodiment similar to the embodiment of FIG. 1. For stabilizing the spacers, an oxide layer 110 is applied onto the substrate before of the sacrificial layer, being very selective towards the sacrificial material during the final etching. When the sacrificial layer is removed, the oxide layer 110 remains and further stabilizes the spacers 45.

Figure 10:
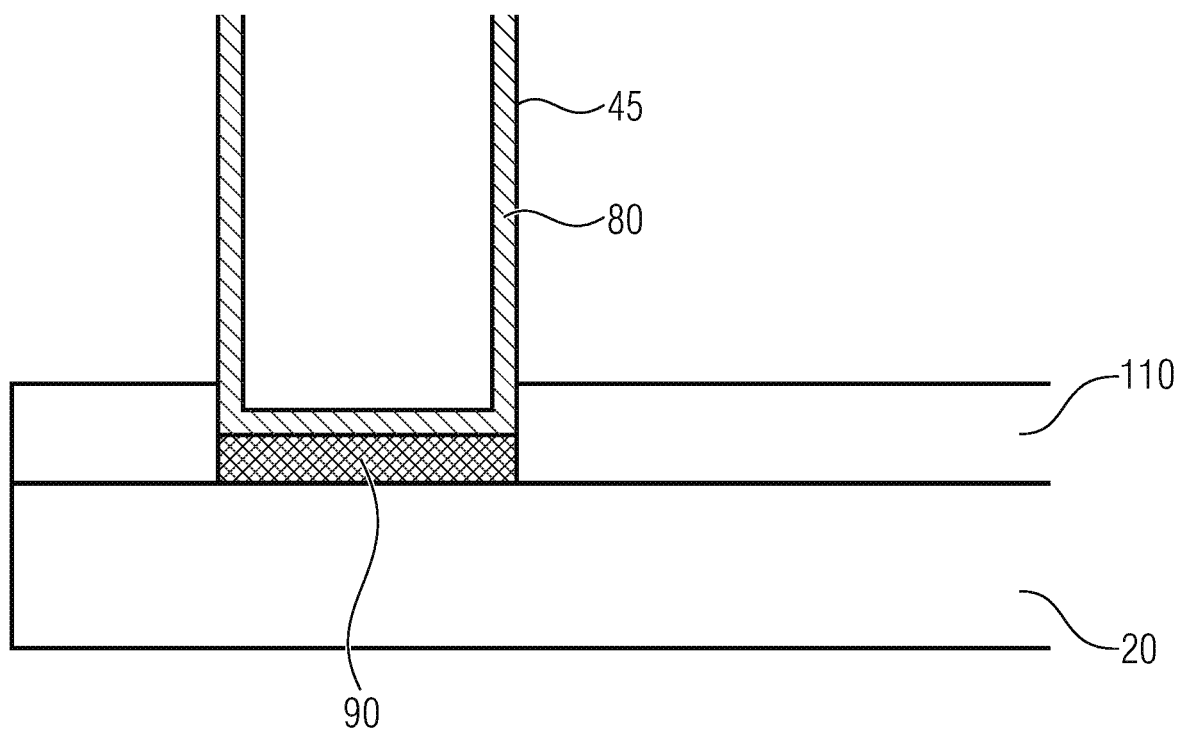
FIG. 10 shows a section around a contact of the substrate.
Figure 11:
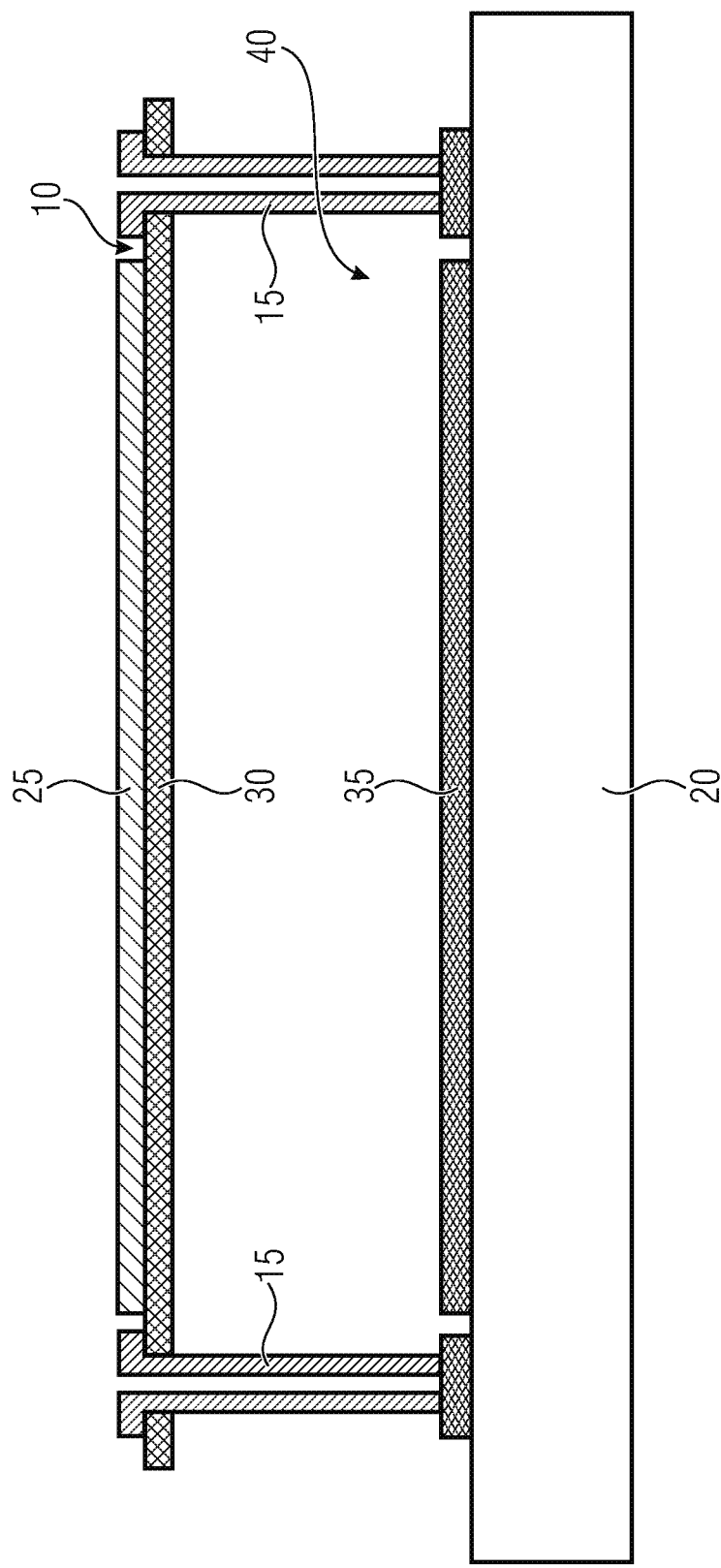
FIG. 11 shows a schematic illustration of a known microbolometer.
Figure 12:
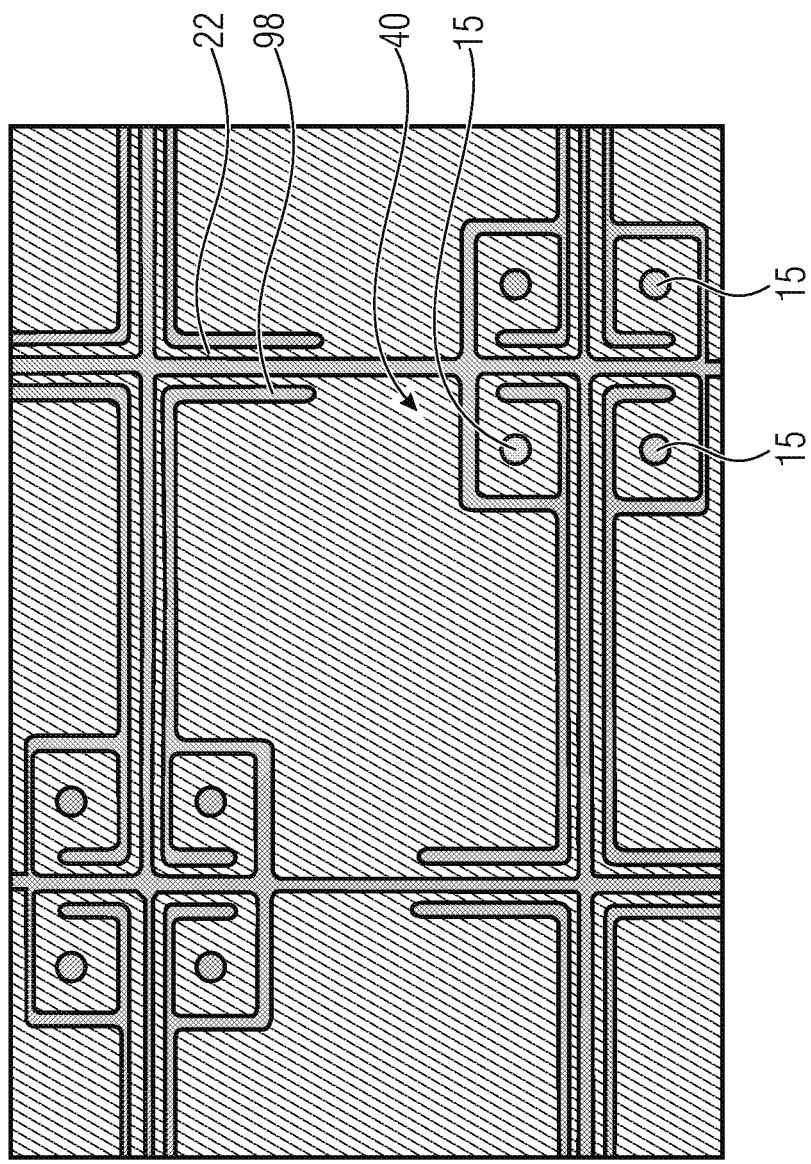
FIG. 12 shows a schematic illustration of a top view of a known membrane, wherein the membrane is suspended on metal contacts by ridges.

FIG. 10 shows a section around a contact of the substrate in a cross-sectional view. In this case, the spacer 45 illustrated comprises only one layer 80, but may comprise a plurality of layers, as described above. The spacer 45 is disposed on the contact 90 of the substrate 20.

The contact 90 may be embodied, for example, of aluminum, tungsten or another electrically conductive material. Due to the large aspect ratio of the spacers 45 and an appropriate method for removing unnecessary material of the spacer on the sacrificial layer, for example an etching process, a material layer of the spacer may remain on the base and/or the bottom of the spacer. The same may increase the contact area with the contact 90 and, therefore, contribute to a better and more secure contacting as well as a secure stand of the spacer. As already shown in FIG. 9, a further material layer, such as that of an oxide, may be applied between the substrate and the sacrificial layer 110 such that, after the removal of the sacrificial layer, for example the etching, an edge or a collar remains around the base and/or the bottom of the spacer and, thus, stabilizes the spacer.

In other words, the spacers may be manufactured by means of a sacrificial layer process. Therein, a hole is etched into the sacrificial layer initially and coated subsequently. For example, for the etching of the hole, the so-called Bosch process may be used, since with this, it is possible to create steep edge angles at large aspect ratios. The layers are deposited by using atomic layer coating ALD so that, even for the steep edge angles mentioned, the etched holes may be covered, that is, the whole area of the hole etched into the sacrificial layer may be evenly thinly coated. In this case, the tolerance should be less than 50 nm. Alternatively, the tolerance may also be smaller than 25 nm or smaller than 5 nm. Further, the deposited layers may be structured according to the manufacturing process. Finally, the removal of the sacrificial layer follows so that the manufactured spacers are self-supporting. Contrary to the embodiments with two spacers exclusively shown so far, it is also possible to provide this and further embodiments with a plurality of spacers. This applies to both spacers 45 and 95 mentioned. Contrary to the spacers 45 and 95 in the corners of the membrane and the reflector shown so far, the same may also be disposed at other locations, for example, in the middle between two corners. Further, it is also possible to realize spacers, for example, from a thermally insulating material, for example an oxide such as aluminum oxide, as an additional support for mechanically stabilizing without comprising an electrical functionality.

Beside the method described and the materials and processes used, further solutions are possible. For example, if the reflector is disposed on the substrate, only one sacrificial layer may be necessitated, onto which the membrane is applied and into which the spacers are deposited. It is also possible to use different materials for the protection layers 75 and 85 or the contact layer 80 or to provide only one or no protection layer. In this case, the contact layer should consist of a material, which is not attacked during removal of the sacrificial layer, for example the etching. Further, the membrane and the contact layer may consist of the same material and one layer, which may also be surrounded by a protection layer. Further, by using the method, it is possible to manufacture different components apart from the radiation detectors described.

As a result of the invention described herein, it is possible to maximize the relative area proportion of the absorber at a given pixel pitch, since lateral ridges, which were so far a main part of the thermal insulation, may be omitted entirely and/or significantly reduced. This saving of space may be used to, for example, expand the effective absorber area. The thermal insulation may be flexibly adapted as per Eq. 4 by the respective layer thicknesses, base radius 65 and length of the spacers 45. The respective maximum is limited by the stability of the spacers 45 and the resonator condition. Therefore, it is even possible to achieve a significantly smaller corresponding thermal conductance than so far possible by using the ridges. Due to both of these factors, the performance of radiation detectors, for existing microbolometers, may be raised significantly. The advantages of a very large absorber area and, at the same time, a good thermal insulation may also result in an enormous benefit, especially when scaling the pixel pitch to smaller values. Due to the smaller dimensions, the spacers may also be denoted as nanotubes. They allow for an enlargement of the available absorber area at a same thermal conductance due to a reduction of the ridge area, the thermal conductance being independently adaptable at the same time.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A radiation detector comprising a substrate and a membrane suspended above the substrate by spacers,
   wherein each of the spacers is provided as a long and thinly layered hollow tube,
   wherein the spacers electrically contact a radiation sensor formed in the membrane, and wherein the membrane is suspended on the spacers without ridges, such that the spacers predominantly thermally insulate the membrane from the substrate.

2. The radiation detector according to claim 1, wherein a reflector is disposed between the substrate and the membrane.

3. The radiation detector according to claim 2, wherein the reflector is disposed between the substrate and the membrane by further spacers.

4. The radiation detector according to claim 2, wherein the reflector comprises a metal layer.

5. The radiation detector according to claim 2, wherein the distance between the reflector and the membrane is an odd, integral multiple of a quarter of a main wavelength to be detected.

6. The radiation detector according to claim 1, wherein the spacers are manufactured by using ALD and a sacrificial layer method.

7. The radiation detector according to claim 1, wherein a wall of the spacers comprises a plurality of layers of different materials.

8. The radiation detector according to claim 7, wherein the plurality of layers comprise at least one layer of TiN, Ti, Cu, W, Sn, Ni, Au, Al or a combination thereof, surrounded by an oxide layer.

9. The radiation detector according to claim 1, wherein a cross-sectional area of the spacers is smaller than or equal to 7 µm² or smaller than or equal to 3 µm² or smaller than or equal to 0.8 µm² across a total length.

10. The radiation detector according to claim 1, wherein a wall of the spacers comprises one layer of a single material.

11. The radiation detector according to claim 1, the radiation detector comprising one layer of a single material.

12. The radiation detector according to claim 1, wherein a length of the spacers between the membrane and the substrate is smaller than or equal to 100 µm.

13. The radiation detector according to claim 1, wherein a length of the spacers between membrane and substrate is larger than or equal to 0.4 µm.

14. The radiation detector according to claim 1, wherein a wall of the spacer comprises at least one layer of a material, wherein the maximum layer thickness is smaller than or equal to 1 µm.

15. The radiation detector according to claim 14, wherein the layer thickness varies across a total length of the spacers between the substrate and the membrane by less than 50 nm or less than 25 nm or less than 5 nm.

16. The radiation detector according to claim 1, wherein the ratio of a length to a width of the spacer is larger than or equal to 10 or larger than or equal to 5 or larger than or equal to 1.

17. The radiation detector according to claim 1, wherein the radiation sensor is a temperature-dependent electrical resistor or a temperature-dependent capacitance or a temperature-dependent inductivity or a diode.

18. The radiation detector according to claim 1, wherein the substrate comprises a temperature evaluation circuit.

19. The radiation detector according to claim 1, the radiation detector being a bolometer.

20. An array of radiation detectors according to claim 1.

21. A method for manufacturing a radiation detector comprising a substrate and a membrane suspended above the substrate by spacers,
wherein each of the spacers is provided as a long and thinly layered hollow tube being manufactured by using ALD and a sacrificial layer method, wherein a hole is etched into a sacrificial layer and coated subsequently by using ALD, so that
the membrane is suspended on the spacers without ridges, such that the resulting spacers electrically contact a radiation sensor formed in the membrane and predominantly thermally insulate the membrane from the substrate.

22. The method according to claim 21, wherein an opening in a sacrificial layer, into which one of the spacers is deposited, is etched by using a DRIE process.

23. The method according to claim 22, wherein the Bosch process or the cryogenic process is used as the DRIE process.

24. The method according to claim 21, wherein a wall of the spacers comprises a layer manufactured by using ALD.

25. The method according to claim 21, wherein the method further comprises forming a reflector between the substrate and the membrane suspended on further spacers.

26. A radiation detector comprising a substrate and a membrane suspended above the substrate by spacers,
wherein the spacers electrically contact a radiation sensor formed in the membrane and predominately thermally insulate the membrane from the substrate,
wherein a reflector is disposed between the substrate and the membrane, and
wherein the reflector is disposed between the substrate and the membrane by further spacers.

27. A method for manufacturing a radiation detector comprising a substrate and a membrane suspended above the substrate by spacers,
wherein the spacers are manufactured by using ALD and a sacrificial layer method so that the spacers electrically contact a radiation sensor formed in the membrane and predominantly thermally insulate the membrane from the substrate, and
wherein the method further comprises forming a reflector between the substrate and the membrane suspended on further spacers.

28. A radiation detector comprising a substrate and a membrane suspended above the substrate by spacers,
wherein each of the spacers is provided as a long and thinly layered hollow tube,
wherein the spacers electrically contact a radiation sensor formed in the membrane and predominantly thermally insulate the membrane from the substrate, and
wherein the membrane is suspended on at least one of the spacers by a ridge, the thermal insulation at the at least one spacer being favored by the spacers such that the thermal insulation is predominantly accomplished by the spacers, wherein a thermal conductance of the ridge is larger than a thermal conductance of the spacer.

29. A method for manufacturing a radiation detector comprising a substrate and a membrane suspended above the substrate by spacers,
wherein each of the spacers is provided as a long and thinly layered hollow tube being manufactured by using ALD and a sacrificial layer method, wherein a hole is etched into a sacrificial layer and coated subsequently by using ALD, so that
the resulting spacers electrically contact a radiation sensor formed in the membrane and predominantly thermally insulate the membrane from the substrate, wherein the membrane is suspended on at least one of the spacers by a ridge, the thermal insulation at the at least one spacer being favored by the spacers such that the thermal insulation is predominantly accomplished by the spacers, that is, a thermal conductance of the ridge is larger than a thermal conductance of the spacer.

* * * * *